(12) United States Patent
Pinheiro et al.

(10) Patent No.: US 10,341,207 B1
(45) Date of Patent: Jul. 2, 2019

(54) DATA MONITORING FOR NETWORK SWITCH RESOURCE

(71) Applicant: HEWLETT PACKARD ENTERPRISE DEVELOPMENT LP, Houston, TX (US)

(72) Inventors: David Rodrigues Pinheiro, Santa Clara, CA (US); Anu Mercian, Santa Clara, CA (US); Chinlin Chen, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/967,096

(22) Filed: Apr. 30, 2018

(51) Int. Cl.
*H04L 12/26* (2006.01)
*H04L 12/825* (2013.01)

(52) U.S. Cl.
CPC ........ *H04L 43/0876* (2013.01); *H04L 43/062* (2013.01); *H04L 47/25* (2013.01)

(58) Field of Classification Search
CPC .... H04L 43/0876; H04L 43/062; H04L 47/25
See application file for complete search history.

(56) References Cited

U.S. PATENT DOCUMENTS

| 785,348 A | 3/1905 | Bushorr |
| 8,139,477 B2 * | 3/2012 | Freimuth ............... G06F 1/3203 370/217 |
| 8,767,549 B2 | 7/2014 | Kashyap et al. |
| 9,654,361 B2 | 5/2017 | Vasseur et al. |
| 9,680,693 B2 | 6/2017 | Barford et al. |

OTHER PUBLICATIONS

Cisco Traffic Anomaly Detector Module, (Web Page), Jan. 6, 2014, 9 Pgs.
Mehdi, S.A. et al., Revisiting Traffic Anomaly Detection Using Software Defined Networking, (Research Paper), 2011, 20 Pgs.

* cited by examiner

*Primary Examiner* — Chandrahas B Patel
(74) *Attorney, Agent, or Firm* — Hewlett Packard Enterprise Patent Department

(57) ABSTRACT

In some examples, a method is described. The method can, for example be performed by a network switch and can include receiving instructions to monitor a switch resource, monitoring time-series data for traffic received and transmitted by the switch, identifying peaks for the switch resource in a specified time period for the monitored data, comparing the identified peaks with data provided during a training phase to identify whether the monitored data includes an anomaly, and generating an alert when the data is identified as containing an anomaly.

20 Claims, 12 Drawing Sheets

U.S. 10,341,207 B1

DATA MONITORING FOR NETWORK SWITCH RESOURCE

BACKGROUND

Computer networks can be used to allow networked devices, such as personal computers, servers, and data storage devices to exchange data. Such networks often include intermediary datapath devices such as network switches, gateways, and routers, to flow traffic along selected datapaths for routing data between networked devices. There is an increasing demand for network connectivity as a medium of communication.

DETAILED DESCRIPTION

Figure 1:
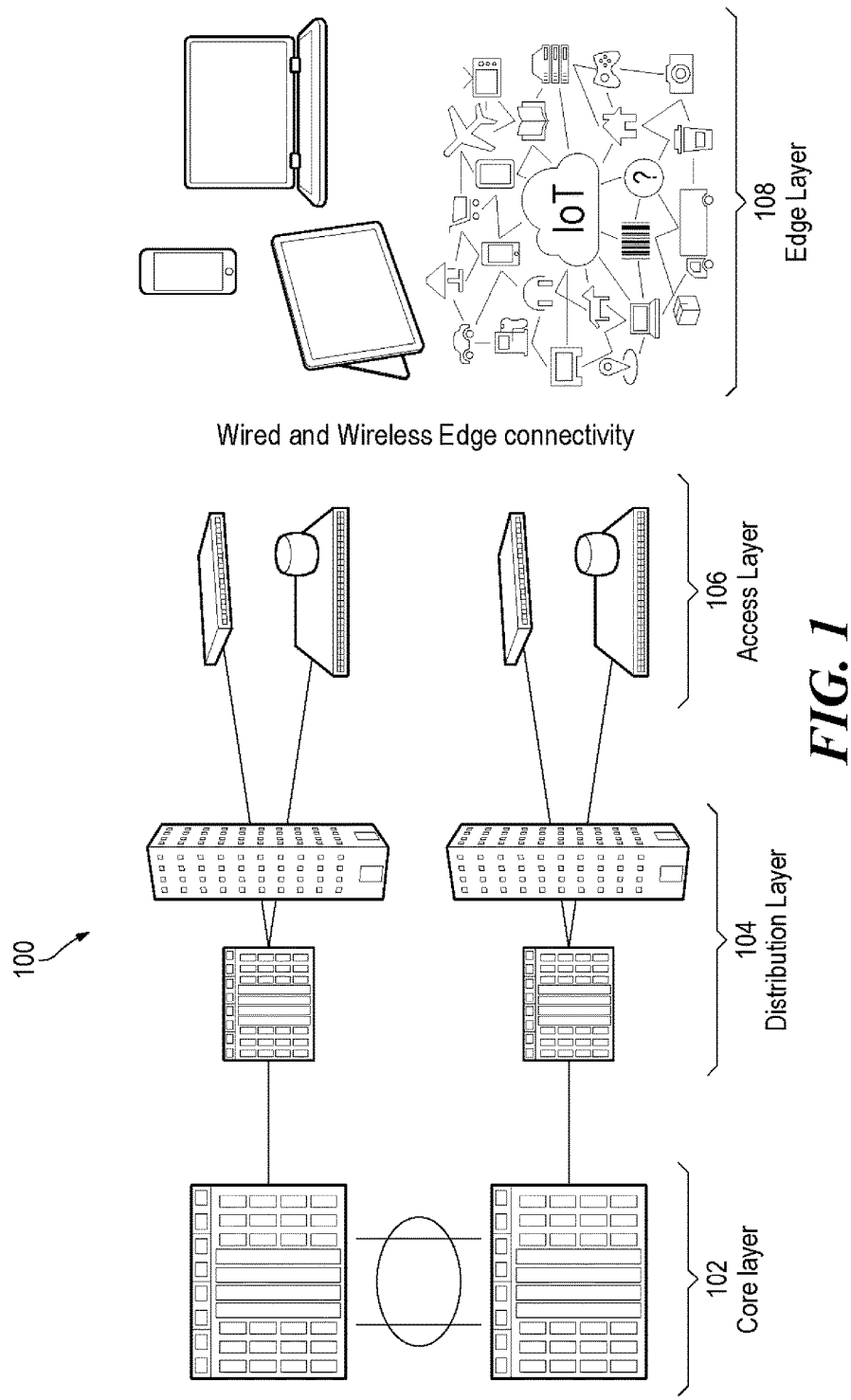
FIG. 1 is a diagram of a network environment, according to an example.

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

There is an increasing demand for network connectivity as a medium of communication. With the adoption of Internet of Things (IoT), the dependence on network connectivity is extending further. The use of IoT may provide for improved intelligence in an edge network. However, in some situations there may also be value in improving intelligence in a core network. Network administrators and other entities often spend a significant amount of time provisioning and maintaining networks manually. For example, some network environments contain a large number of network configurations that are monitored for potential issues in order to provide seamless network connectivity for multiple network and host devices at the edge.

With the surge in Software Defined Networking (SDN), automating some network provisioning has become possible, but there is still a large gap in the networking industry to address intelligent troubleshooting mechanisms that simplify tasks for network administrations while additionally or alternatively enabling enterprises to reduce their network maintenance Capital Expenditure (CAPEX) and Operational Expenditure (OPEX).

Certain implementations of the present disclosure are directed to an improved network switch that allows customers to troubleshoot switch resources and leverage machine-learning algorithms to make intelligent decisions in their core network. In some implementations, the network switch may be provided with an analytics engine for anomaly detection that can, for example, be used for intelligence in a core network. Certain implementations of the present disclosure allow for the collection of time-series traffic data, querying based on a user's analytical priority, and can provide flexibility to perform multiple desired actions, such as configuring switch via a Command Line Interface (CLI) and/or REpresentational State Transfer (REST).

In some implementations, a method can include: (a) receiving instructions to monitor a switch resource; (b) monitoring time-series data for traffic received and transmitted by the switch; (c) identifying peaks for the switch resource in a specified time period for the monitored data; (d) comparing the identified peaks with data provided during a training phase to identify whether the monitored data includes an anomaly; and (e) generating an alert when the data is identified as containing an anomaly. Certain implementations of the present disclosure may allow for improved root-cause analysis, automated network provisioning using scripts, and continuous network activity monitoring for campuses or other environments. Certain implementations of the present disclosure can allow for troubleshooting of switch resources and leveraging machine-learning algorithms to make intelligent decisions in a core network. Other advantages of implementations presented herein will be apparent upon review of the description and figures.

FIG. 1 is a diagram of an example network environment 100. In some situations network environment 100 can be abstracted as a multiple layer hierarchical internetworking model. Such a model can, for example, divide an enterprise network into four layers: (1) core layer 102, (2) distribution layer 104, (3) access layer 106, and (4) edge layer 108, each layer being described in further detail below.

As used herein, the term "core layer" can, for example, refer to a network layer responsible for providing high-speed, highly redundant forwarding services to move packets between distribution-layer devices in different regions of the network. Network devices, such as switches and routers, at the core layer are usually the most powerful, in terms of raw forwarding power. In an enterprise network, core network devices can be selected to manage high-speed network connections, such as for example, 10 Gigabit Ethernet.

As used herein, the term "distribution layer" can, for example, refer to a network layer responsible for managing routing, filtering, and Quality of Service (QoS) policies. Network devices at the distribution layer can, for example, manager individual branch-office Wide Area Network (WAN) connections. The distribution layer can, in some implementations, be referred to as a Workgroup layer.

As used herein, the term "access layer" can, for example, refer to a layer that connects end-stations, such as certain host devices, servers, etc. In some networks, access layer devices are commodity switching platforms, and may or may not provide layer 3 switching services. In some implementations, such access layer devices can be in the form of suitable routers, controllers, gateways, Access Points (APs), etc. The access layer can, in some implementations, be referred to as a "desktop layer" as it can focus on connecting client nodes, such as workstations, to the network.

As used herein, the term "edge layer" can, for example, refer to a layer containing edge devices, which may have wireless or wired connections to the access layer. In some implementations, such edge devices can, for example, be in the form of suitable mobile phones, tablets, laptops, servers, desktop computers, printers, wireless sensors, beacons, Internet of Things (IoT) devices, etc. In certain implementations, one or more edge devices can be in the form of a desktop computer including a monitor for presenting information to an operator and a keyboard and mouse for receiving input from an operator.

One or more devices at the core, distribution, or access layer can be in the form of a network controller. As used herein, the term "controller" can, for example, refer to any suitable entity that handles control and management functions of a network or equipment thereof. For example, such a controller can be used to control one or more aspects of an AP, such as channel assignment, beamforming, radio resource management (RRM), etc. In some implementations, applications can run on a controller or on other devices on the network (or otherwise in communication with the network) to meet customer use cases, such as to achieve a desired throughput (or another Quality of Service (QoS)) over the network, enforce security provisions or access control policies for the network, or provide another suitable service or functionality, and can for example, also enable specific switch configurations when a condition is met.

In some implementations, such a controller can allow for the decoupling of traffic routing control decisions (e.g., which port of a given switch should be used to forward traffic to a given destination) from the network's physical infrastructure. For example, in some implementations, a controller can be in the form of an SDN controller and switches can be in the form of SDN-enabled switches that are within the control domain of the SDN controller. It is appreciated that certain implementations of the present disclosure can operate in non-SDN environments. In some environments, one or more network nodes within environment 100 may be deemed to be "controlled" by another device, such as a controller. As used herein, the term "controlled" can, for example, refer to devices within the control domain of a controller or otherwise controllable by a controller. Such a controlled node can, for example, communicate with the controller and can allow the controller to manage the node in accordance with a protocol. For example, an OpenFlow-compatible switch controlled by a controller with SDN capabilities may permit the controller to add, update, and delete flow entries in flow tables of a switch using suitable commands. It is appreciated that in some implementations, any resource that has a REST interface may be monitored, even if the system does not rely on OpenFlow. In some implementations, the methods described herein are not performed by a controller, but by a separate device (e.g., a network switch) in order to assist troubleshooting by proactively detecting anomalies and collect relevant data.

In some network environments, a data packet may be routed from a given core, distribution, or access layer network device to a given edge device through one or more data paths that may include one or more wired and/or wireless links. For example, in some network environments, a data packet may be routed to a device along a first datapath that uses an AP or alternatively along a second datapath that uses a wired switch instead of an AP. A given data path for data packets within environment 100 can be determined by a controller (or another entity, such as by a network administrator, by datapath nodes themselves, etc.) based on one or more static parameters (e.g., link speeds, number of hops between nodes, etc.) and can further (or alternatively) be based on one or more dynamic parameters (e.g., QoS, network latency, network throughput, network power consumption, etc.).

Network nodes within environment 100 can forward traffic along a datapath based on metadata within the traffic. For example, traffic in the form of a packet can be received at a switch (or another suitable intermediary network node). For consistency, the industry term "packet" is used throughout this description, however, it is appreciated that the term "packet" as used herein can refer to any suitable protocol data unit (PDU). Such a packet can, for example, include payload data as well as metadata in the form of control data. Control data can, for example, provide data to assist the network node with reliably delivering payload data. For example, control data can include network addresses for source and destination nodes, error detection codes, sequencing information, packet size of the packet, a time-to-live (TTL) value, etc. In contrast, payload data can include data carried on behalf of an application for use by source and destination nodes.

The functionality of a controller or other network equipment within environment 100 can, for example, be implemented in part via a software program on a standalone machine, such as a standalone server. In some implementations, a controller can be implemented on one or more multi-purpose machines, such as a suitable desktop computer, laptop, tablet, or the like. In some implementations, a controller can be implemented on a suitable non-host network node, such as certain types of network switches. In some implementations, the functionality of a controller can be implemented within the hardware and software of a switch. It is appreciated that the functionality of a controller may be split among multiple controllers or other devices. In some networks, network devices are in communication with multiple controllers such that control of the network can be smoothly handed over from a first controller to a second controller if a first controller fails or is otherwise out of operation. In some implementations, or more controllers can operate in a distributed fashion over multiple appliances but present themselves as a single entity to the network.

As another example, multiple controllers can be used to work together to concurrently control certain networks. In such networks, a first controller can, for example, control certain network devices while a second controller can control other network devices.

Various intermediary nodes within the network environment can, for example, be in the form of switches or other multi-port network bridges that process and forward data at the data link layer. In some implementations, one or more of the nodes can be in the form of multilayer switches that operate at multiple layers of the Open Systems Connection (OSI) model (e.g., the data link and network layers). Although the term "switch" is used throughout this description, it is appreciated that this term can refer broadly to other suitable network data forwarding devices. For example, a general purpose computer can include suitable hardware and machine-readable instructions that allow the computer to function as a network switch. It is appreciated that the term "switch" can include other network datapath elements in the form of suitable routers, gateways and other devices that provide switch-like functionality for the network. A gateway can, for example, be in the form of a network node that acts as an entrance to another network, such as the Internet or another suitable Wide Area Network (WAN) or Local Area Network (LAN).

The various nodes within network environment 100 can be connected via one or more data channels, which can, for example be in the form of data cables or wireless data channels. Although a single link (i.e., a single line in FIG. 1) between each network node is illustrated, it is appreciated that each single link may include multiple wires or other wired or wireless data channels.

In the example environment 100 depicted in FIG. 1, the various network nodes are in the form of intermediary nodes (e.g., switches, servers, etc.) It is appreciated however, that the implementations described herein can be used or adapted for networks including more or fewer devices, different types of devices, and different network arrangements.

Figure 2:
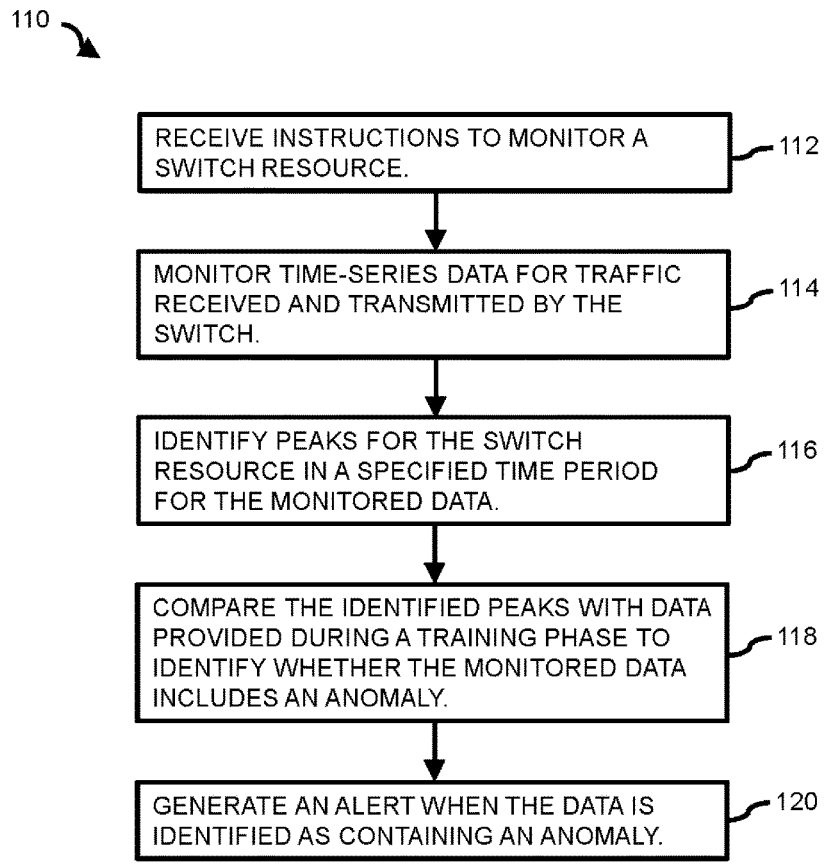
FIG. 2 is a flowchart for a method, according to an example.

FIG. 2 depicts a flowchart for an example method 110 related to data monitoring for network switch resources. For illustration, the description of method 110 and its component operations make reference to the example network environment 100 of FIG. 1 and elements thereof, such as for example network switches. It is appreciated that method 110 or aspects thereof can be used or otherwise applicable for any suitable network or network element described herein or otherwise. For example, method 110 can be applied to an environment 100 with a different number or type of network elements.

In some implementations, method 110 can be implemented or otherwise executed through the use of executable instructions stored on a memory resource 130 (e.g., the memory resource 130 of the computing device of FIG. 11), executable machine readable instructions stored on a storage medium (e.g., the medium of FIG. 12), in the form of electronic circuitry (e.g., on an Application-Specific Integrated Circuit (ASIC)), and/or another suitable form. Although the description of method 110 herein primarily refers to operations performed on a switch for purposes of illustration, it is appreciated that in some implementations, method 110 can be executed on another computing device within network environment 100 or in data communication with network environment 100. In some implementations, method 110 can be executed on network devices in parallel (e.g., in a distributed computing fashion).

Method 110 includes receiving (at block 112) instructions to monitor a switch resource. The switch resource for monitoring can, for example, be a processor usage, bandwidth, or other suitable resource for monitoring. In some implementations, the switch resource for monitoring can, for example, include CPU resources, memory pattern, transmit and received packets, fan speed, temperature, network route information etc. Various additional examples of monitored switched resources are provided herein with respect to specific implementations of the present disclosure. In some implementations, the received instructions include criteria for the switch resource and instructions to perform an action when the criteria is satisfied. Such a criteria can, for example be in the form of a threshold value. For example, such a criteria can be whether a processor usage for a switch is above a certain percentage. In some implementations, Condition Query Language ("CQL") can be used to accept aggregation, transitive, and ratio conditions of monitored metrics to be satisfied. For example, one such CQL criteria can be "If CPU_Usage>80%". In some implementations, such a criteria is whether a number of received packet bytes is more than specified threshold for a specified duration.

In some implementations, receiving instructions to monitor a switch resource includes receiving a script specifying a resource in the switch to be monitored via a REST Resource Identifier (URI) for the resource. It is appreciated that other suitable mechanisms for providing monitoring instructions may be used in certain implementations of the present disclosure. Examples of the use of such a REST URI are provided herein with respect to specific implementations of the present disclosure.

In some implementations, receiving instructions to monitor a switch resource includes receiving a script specifying criteria for the resource and an operation to be performed when the criteria is satisfied. Such an operation can, for example, include applying a specific policy for predetermined traffic processed by the switch. In some implementations, the operation can include stopping transmission of traffic by the switch or any other suitable operation before by the switch or other network element within network environment. Additional examples of such operations are provided herein.

Method 110 includes monitoring (at block 114) time-series data for traffic received and transmitted by the switch, identifying (at block 116) peaks for the switch resource in a specified time period for the monitored data, and comparing (at block 118) the identified peaks with data provided during a training phase to identify whether the monitored data includes an anomaly. Monitoring of time-series data for traffic received and transmitted by the switch can, for example, include monitoring a number of packets, bytes, and source-destination pairs. Comparing the identified peaks with data provided during a training phase can, for example, include comparing monitored peaks with a weighted distance computed from the training phase. One or more aspects of blocks 114, 116, and 118 can rely on one or more machine learning algorithms, such as suitable standard-deviation and Holt-Winters analysis, to predict a time-series of monitored data. In some implementations, the training phase can be an ongoing and optimizing process, whereas in some implementations the training phase can occur at an initial time prior to some or all other operations of method 110.

In some implementations, a "Max" algorithm may be used to predict a time-series of monitored data or for other relevant analysis. In such an algorithm, a user may provide the following parameters (if a user does not provide, some default values may be provided): (a) initial_learning_time: Time used in the start of an agent to learn the maximum and minimum thresholds; (b) low_threshold: The learned minimum value; (c) high_threshold: The learned maximum value; and (d) continuous_learning_window: The continuous learning window after the initial learning is acquired. In the learning time, the maximum thresholds are computed and twice that maximum value is the high threshold which is used in the conditional query. In some implementations, the maximum threshold is computed by a factor (2×, 3×, 112×, etc.) of the maximum value. The selection of a suitable factor may assist in reducing a number of false positives, since the threshold could be calculated to close to the real data, generating alerts for situation that anomaly is not actually happening. Examples of such monitoring, identifying, and comparing of blocks 114, 116, and 118 and provided herein with respect to specific implementations of the present disclosure.

Method 110 includes generating (at block 120) an alert when the data is identified as containing an anomaly. In some implementations, such an alert may trigger the generation of a Syslog entry to identify Root cause of source of high CPU usage or other criteria. It is appreciated that block 120 of generating an alert may include and/or trigger other operations, such as a notification to a network administrator or other entity. In some implementations, a CLI command can be used to execute actions and then after the condition cleared, an alert can be reset back to a normal level. The whole process to achieve the network can, in some implementations, be self-correcting. In some implementations, a history of the alert may be stored for further analysis or presentation (e.g., in a system dashboard). Other examples of suitable alerts and/or operations are provided herein with respect to specific implementations of the present disclosure.

It is appreciated that one or more operations of method 110 can be performed periodically. For example, in some implementations, one or more of blocks 112, 114, 116, 118, and 120 (or other operations described herein) may be performed periodically. The various period times for blocks 112, 114, 116, 118, and 120 (or other operations described herein) may be the same or different times. For example, in some implementations, the period of block 114 is every 1 minute and the period of block 116 is every 2 minutes. It is further appreciated, that the period for a given block may be regular (e.g., every 1 minute) or may be irregular (e.g., every 1 minute during a first network condition, and every 2 minutes during a second network condition). In some implementations, one or more of block 112, 114, 116, 118, and 120 (or other operations described herein) may be non-periodic and may be triggered by some network or other event.

Although the flowchart of FIG. 2 shows a specific order of performance, it is appreciated that this order may be rearranged into another suitable order, may be executed concurrently or with partial concurrence, or a combination thereof. Likewise, suitable additional and/or comparable operations may be added to method 110 or other methods described herein in order to achieve the same or comparable functionality. In some implementations, one or more operations are omitted. For example, in some implementations, block 120 of generating an alert from method 110 or performed by a different device. It is appreciated that blocks corresponding to additional or alternative functionality of other implementations described herein can be incorporated in method 110. For example, blocks corresponding to the functionality of various aspects of implementations otherwise described herein can be incorporated in method 110 even if such functionality is not explicitly characterized herein as a block in method 110.

Figure 3:
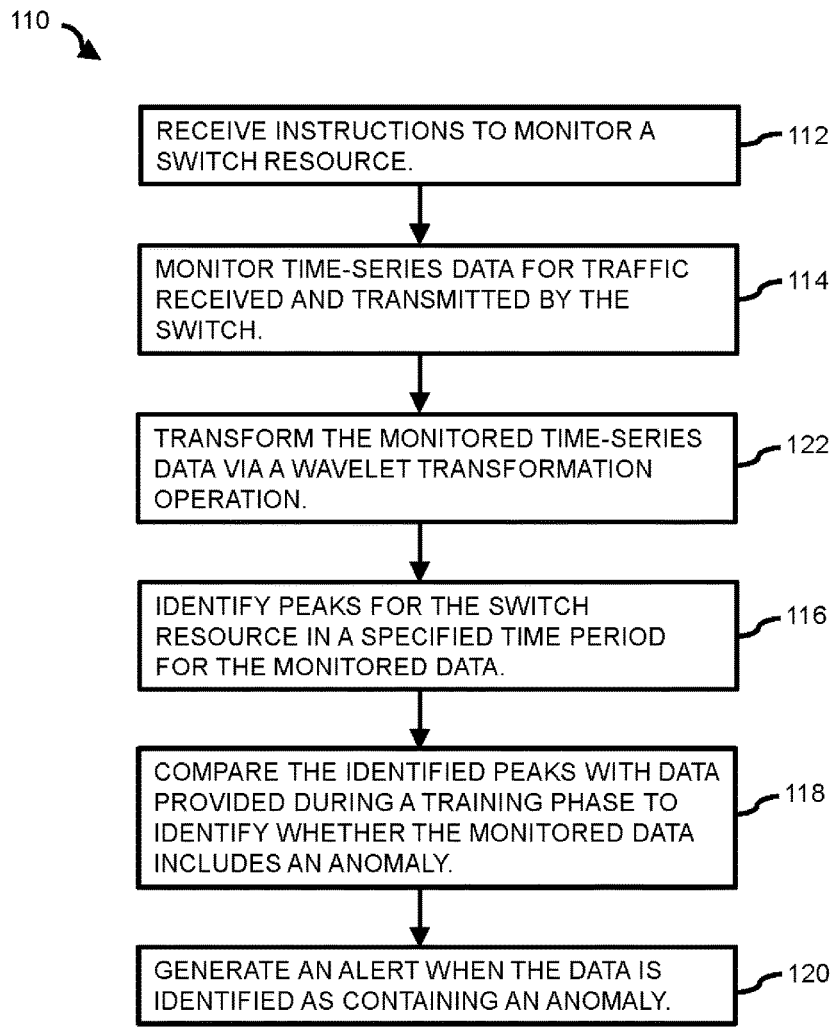
FIG. 3 is a flowchart for a method, according to another example.

FIG. 3 illustrates another example of method 110 in accordance with the present disclosure. For illustration, FIG. 3 reproduces various blocks from method 110 of FIG. 2, however it is appreciated that method 110 of FIG. 3 can include additional, alternative, or fewer operations, functionality, etc., than method 110 of FIG. 2 and is not intended to be limited by the diagram of FIG. 1 (or vice versa) or the related disclosure thereof. It is further appreciated that method 110 of FIG. 2 can incorporate one or more aspects of method 110 of FIG. 3 and vice versa. For example, in some implementations, method 110 of FIG. 2 can include the additional operation described below with respect to method 110 of FIG. 3. Method 110 of FIG. 3 includes transforming (at block 122) the monitored time-series data via a wavelet transformation operation. As used herein, the term "wavelet transformation" can, for example, refer to the use of functions that are localized in both a real and Fourier space. It is appreciated that other suitable operations may be applied to the monitored time-series data in order to process the data for subsequent analysis for anomalies or other purposes.

Figure 4:
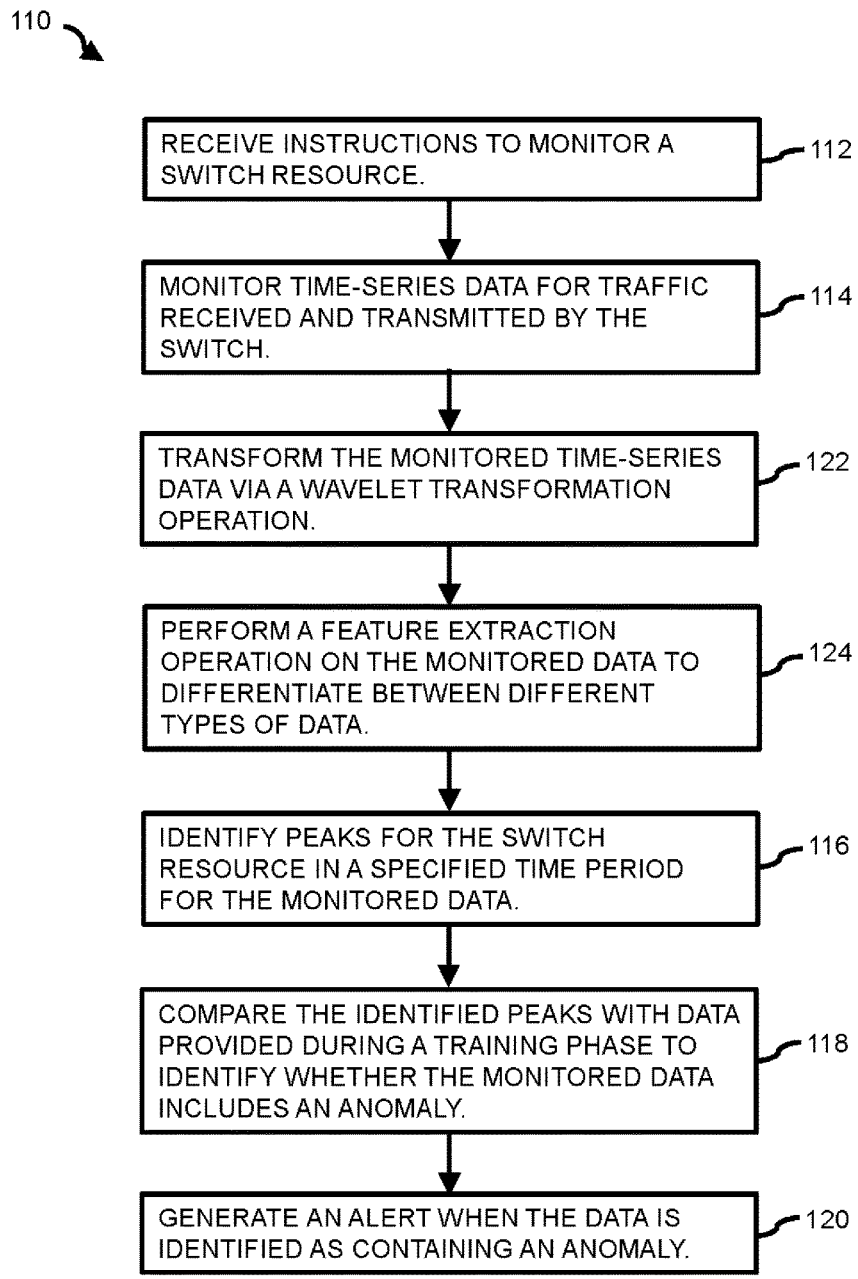
FIG. 4 is a flowchart for a method, according to another example.
Figure 5:
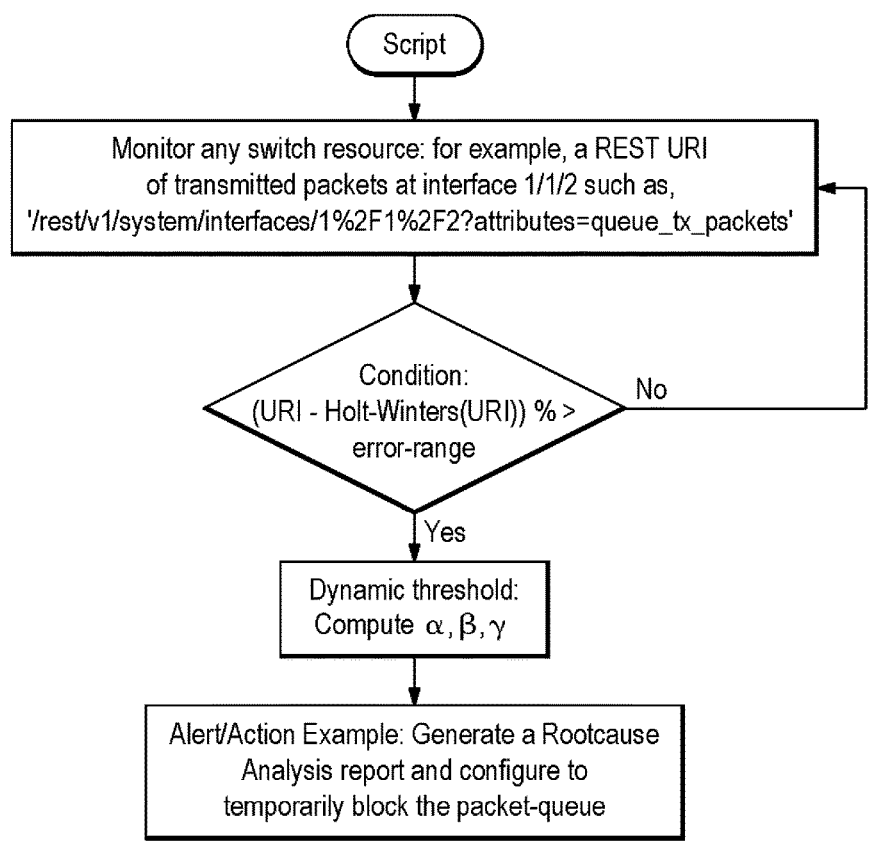
FIG. 5 is a flowchart for a method, according to another example.
Figure 6:
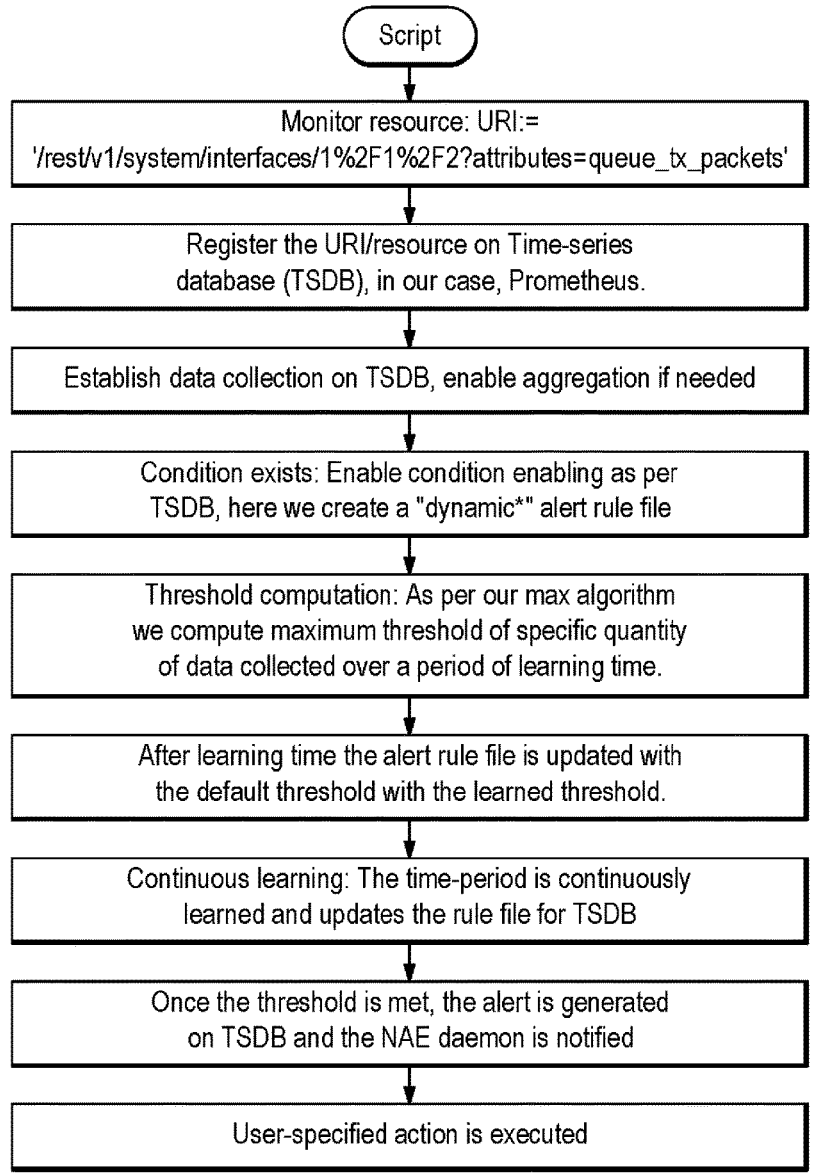
FIG. 6 is a flowchart for a method, according to another example.
Figure 7:
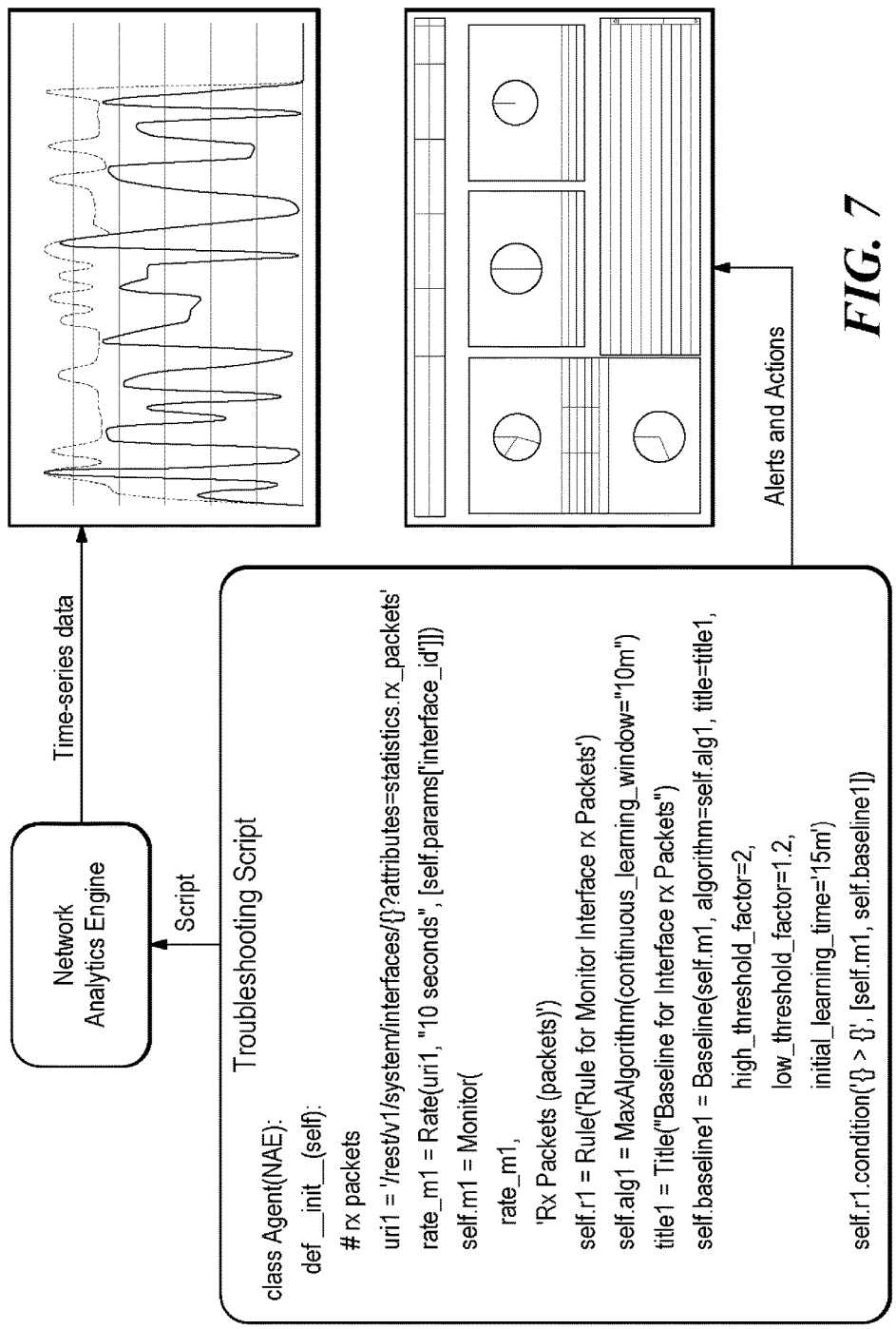
FIG. 7 is a diagram including a network analytics engine, according to an example.
Figure 8:
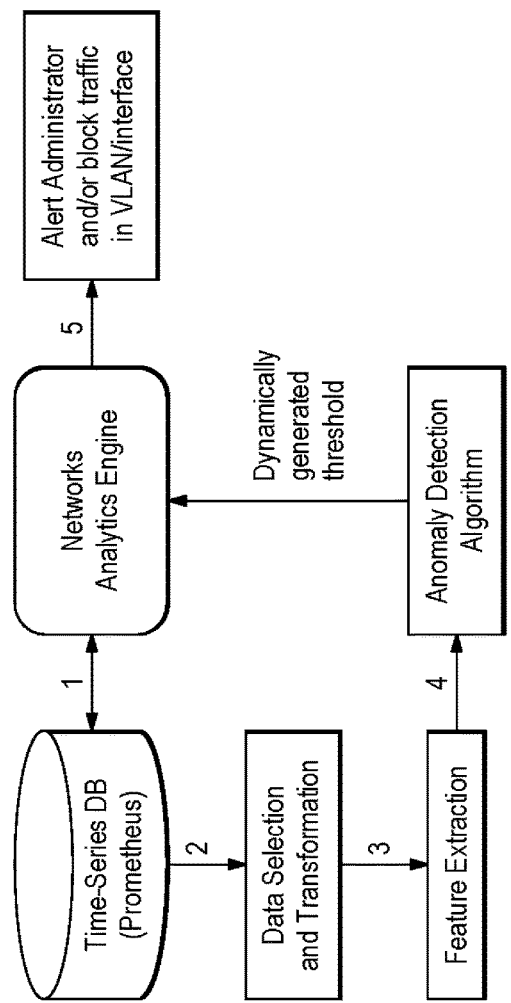
FIG. 8 is a diagram and flowchart including a network analytics engine, according to an example.
Figure 9:
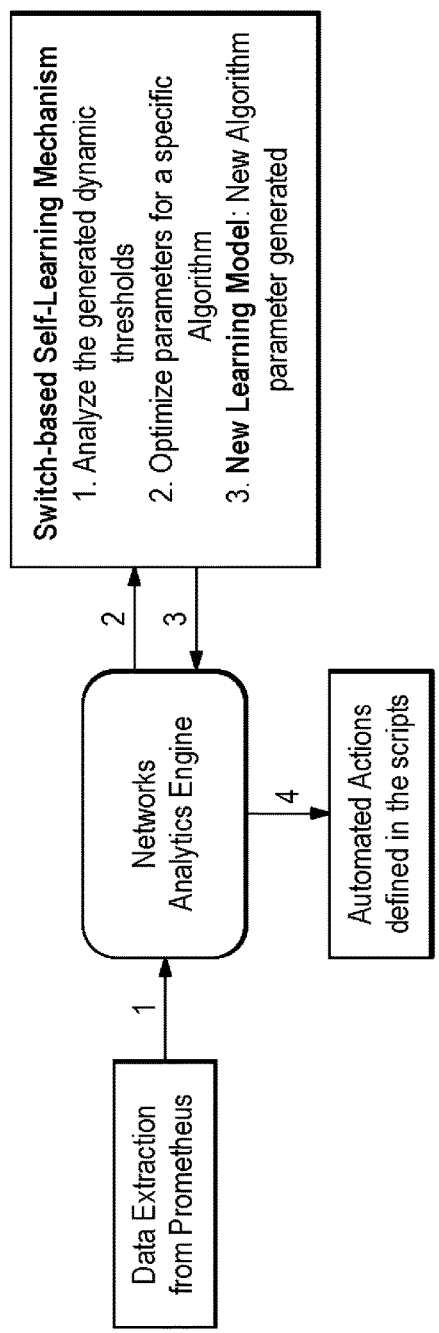
FIG. 9 is a diagram and flowchart including a network analytics engine, according to another example.
Figure 10:
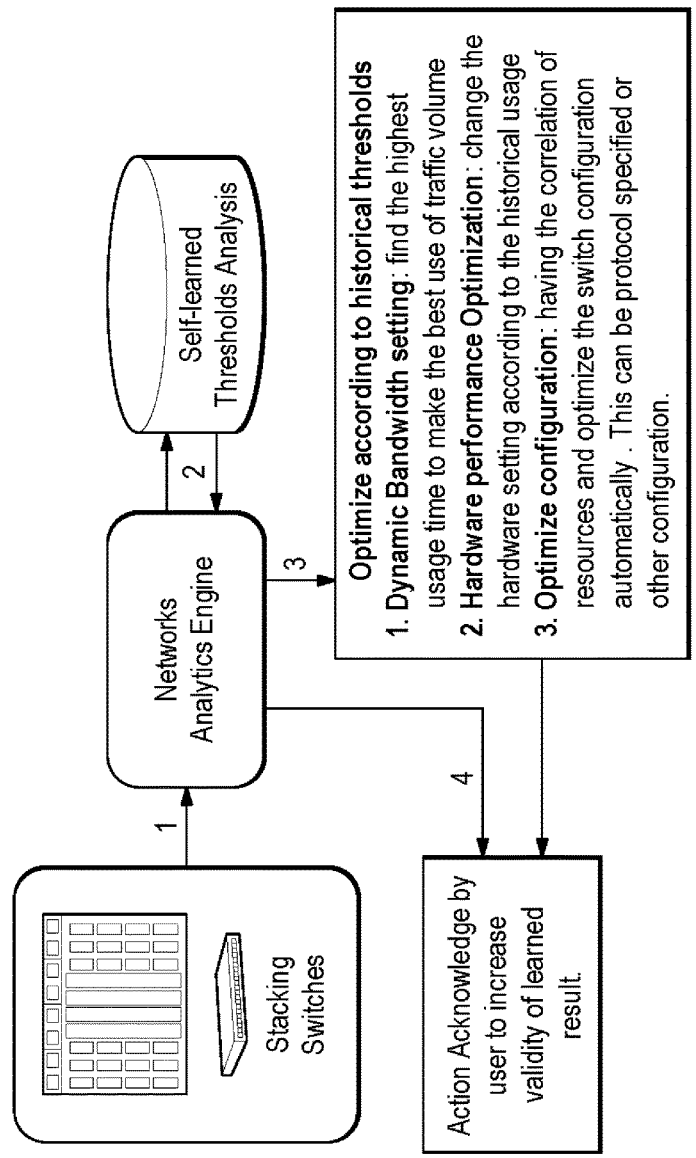
FIG. 10 is a diagram and flowchart including a network analytics engine, according to another example.

FIG. 4 illustrates another example of method 110 in accordance with the present disclosure. For illustration, FIG. 4 reproduces various blocks from method 110 of FIG. 2, however it is appreciated that method 110 of FIG. 4 can include additional, alternative, or fewer operations, functionality, etc., than method 110 of FIG. 2 and is not intended to be limited by the diagram of FIG. 1 (or vice versa) or the related disclosure thereof. It is further appreciated that method 110 of FIG. 2 can incorporate one or more aspects of method 110 of FIG. 4 and vice versa. For example, in some implementations, method 110 of FIG. 2 can include the additional operations described below with respect to method 110 of FIG. 4. Method 110 of FIG. 4 includes performing (at block 124) a feature extraction operation on the monitored data to differentiate between different types of data. In some implementations, the feature extraction operation includes classifying packets based on flow and protocol.

Various example implementations for the present disclosure will now be described and illustrated with reference to flowcharts and diagrams in FIGS. 5-10. It is appreciated that these examples may include or refer to certain aspects of other implementations described herein (and vice-versa), but are not intended to be limiting towards other implementations described herein. Moreover, it is appreciated that certain aspects of these implementations may be applied to other implementations described herein.

Certain implementations of the present disclosure can provide a Network Analytics Engine (NAE), which can, for example, refer to an embedded infrastructure that can provide analytic capability on a network switch operating system. Such an NAE can, in some implementations, be compatible with a suitable programming language, such as for example Python™, to provide a user with an ability to build their own solution workflows. Such a NAE can, in some implementations, enable analyzing of large datasets to produce results that are useful to customers to understand their network environment.

In some implementations, scripts for such a programming language can be used to enable control over monitoring switch resources. Such monitoring capabilities can, for example, leverage a database-centric architecture of certain network switches, which, may allow a user to audit desired database resources. In some implementations, such an NAE may provide auto-generated Web User Interface (UI) and REST Application Programming Interface (API) functionality.

In some implementations, such an NAE can allow users to upload a Python™ (or other suitable programming language) script with a built-in API to allow the user to specify any resource in the switch to be monitored using the resource's REST URI, and also to optionally apply a conditional query on the resource to trigger alarms/alerts to the user when the condition is met. The user can then have the Python™ script determine what action can be taken under those circumstances. In some implementations, the system may allow a user to specify a resource in the switch to be monitored via a Command Line Interface (CLI). Such an implementation may rely on an encoding mechanism, such as base64 to ensure that the source code is not misinterpreted by the CLI infrastructure. In some implementations of the present disclosure, three main stages of network analytics functionality can be provided: (1) a script stage that is input to the engine and initiates the process, (2) a Time-Series (TS) data stage in which the engine understands the resources to be monitored and plots the corresponding data and stores in the TS-database, (3) an Alerts & Actions stage in which conditions can be provided and when they are met, alerts are triggered and corresponding actions are executed. In some implementations, after the action executed, the condition may be cleared and the alert removed.

Resource monitoring can be used to assist in the analysis of time-series data for real-time traffic. Such monitoring can, for example, be performed by an autonomous micro-service that extracts the resource via its REST URI and identifies the table and column details of the resource available in the database and obtains predetermined data. It can then map the data type for appropriate processing and time-stamping of the data to convert it to a time-series data obtained at the current time. The data can then be populated onto a time-series database such as Prometheus™ which we can, in some implementations, be leveraged for time-series operations such as functions relating to rate, sum, average, etc. In some implementations, a script is provided (e.g., a Python™ script) to create a monitoring instance and collect time-stamped data to monitor. In some implementations, a user input is provided to monitor a switch.

Certain time-series operations can, for example, include conditional query and alerting when a specified condition is met. This functionality can, for example, be used to understand a condition associated with the monitored resource, which the user can specify in some implementations. For example, if the resource monitored is the received packet bytes and the user wants to be notified if the received packet-byte rate is more than a specific threshold for a specified duration (e.g., if received packet bytes (e.g., "rx_pkt_bytes")>threshold for 10 minutes), then a predetermined action can also be performed. The action can vary from just notifying the user/admin, to configuring the switch resource to temporarily pausing or buffering the received packets to avoid transmitting them further to the edge-network. Establishing this facility in the core-switch enables the feature and customer to perform various advanced analytics and predictive analysis to render the network automated and more intelligent.

One or more implementations of the present disclosure can be configured to perform traffic-anomaly detection on a core-switch, which can, in some situations, avoid the use of expensive anomaly detection systems deployed in the network. In some environment, dedicated commercial anomaly detectors are expensive boxes. Moreover, enabling a NAE with this functionality can, for in some situations, significantly reduce CAPEX for a customer. Certain implementations can provide a transformation and feature extraction of the collected data from the time-series database to the predictive analysis of the output of new data. In some implementations, alarms can be triggered based on a learned threshold that is dynamically adopted by training and classification using an algorithm and in turn using it to make the entire system more reliable to any new threat.

Certain implementations may use one or more suitable traffic-anomaly detection techniques. For example, in some implementations, K-means clustering based classification and outlier detection may be used to detect various type of "flooding" in the network and threshold estimation. In some implementations, such a classification can rely on the following operations and may allow for predictive analysis of the traffic:

(1) The incoming traffic is monitored by observing the "rx-packet" and "tx-packet" as a time-series data, from the Time-series database (e.g., a suitable Prometheus™ database). A total number of packet, bytes, source-destination pairs, and/or other resources in the switch or other network device can be monitored.

(2) The data can then be transformed to a mathematically simplistic form. For time-series data, wavelet transformation can, for example, be used.

(3) Feature extraction can be used to enable efficient classification of data to differentiate various types of data. For example, in some situations, TCP and UDP packets can have different characteristics, and packet classification based on flow and protocol may be sufficient for feature extraction from the raw data.

(4) An algorithm can be run to detect data anomalies. In some implementations, such an algorithm can be referred to as a "MAX algorithm" because it finds a number of peaks in the learning window of the smoothed data and verifies that data peaks are continuously refreshed for the trained period. For new data, the data can then be compared with the peaks from all computed peaks and based on the weighted distance computed from the training phase. The weighted distance can, for example, be selected or calculated in order to minimize a cost of error. Based on this comparison, the data may then be marked as an anomaly if appropriate. In some implementations, "Ping flooding" can be detected using an anomaly detection algorithm. Such an algorithm can, for example, be used to detect User Datagram Protocol (UDP) flood and port scans in the network. In such an implementations, ping flood can, for example, be detected by monitoring packet buffers and source-destination ("src-dst") pairs. It is appreciated that other various data sets within a core-aggregation switch such as fan speed, QoS statistics, power supply statistics, spanning-tree route statistics, etc., can be monitored using the NAE feature and various learning algorithms can be included to perform dynamic analysis on or off the box. Such monitoring can, in some implementations, provide a rich set of prospective use-cases for an analytics engine of a core network switch.

(5) Anomalies in the new data can then be reported to the administrator using an Alert & Action feature of the NAE or another suitable notification mechanism.

Figure 11:
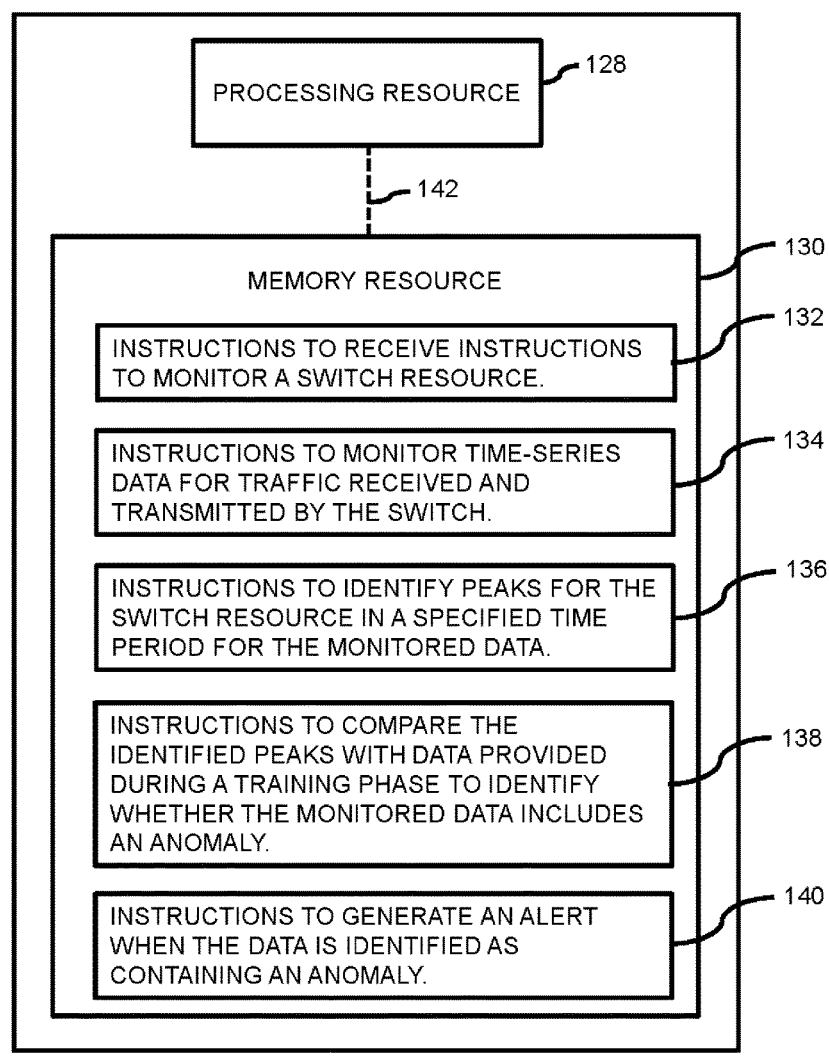
FIG. 11 is a diagram of a computing device, according to an example.

FIG. 11 is a diagram of a computing device 126 in accordance with the present disclosure. Computing device 126 can, for example, be in the form of a network switch or another suitable computing device within network environment 100 or in communication with network environment 100 or equipment thereof. As described in further detail below, computing device 126 includes a processing resource 128 and a memory resource 130 that stores machine-readable instructions 132, 134, 136, 138, and 140. For illustration, the description of computing device 126 makes reference to various aspects of diagrams and flowcharts described herein. However it is appreciated that computing device 126 can include additional, alternative, or fewer aspects, functionality, etc., than the implementations described elsewhere herein and is not intended to be limited by the related disclosure thereof.

Instructions 132 stored on memory resource 130 are, when executed by processing resource 128, to cause processing resource 128 to receive instructions to monitor a resource of the switch. Instructions 132 can incorporate one or more aspects of blocks of method 110 or another suitable aspect of other implementations described herein (and vice versa).

Instructions 134 stored on memory resource 130 are, when executed by processing resource 128, to monitor time-series data for traffic received and transmitted by the switch. Instructions 134 can incorporate one or more aspects of blocks of method 110 or another suitable aspect of other implementations described herein (and vice versa).

Instructions 136 stored on memory resource 130 are, when executed by processing resource 128, to cause processing resource 128 to identify peaks for the switch resource in a specified time period for the monitored data. Instructions 136 can incorporate one or more aspects of blocks of method 110 or another suitable aspect of other implementations described herein (and vice versa).

Instructions 138 stored on memory resource 130 are, when executed by processing resource 128, to cause processing resource 128 to compare the identified peaks with data provided during a training phase to identify whether the monitored data includes an anomaly. Instructions 138 can incorporate one or more aspects of blocks of method 110 or another suitable aspect of other implementations described herein (and vice versa).

Instructions 140 stored on memory resource 130 are, when executed by processing resource 128, to cause processing resource 128 to generate an alert when the data is identified as containing an anomaly. Instructions 140 can incorporate one or more aspects of blocks of method 110 or another suitable aspect of other implementations described herein (and vice versa).

In some implementations, additional instructions can be stored on memory resource 130. Such instructions can, when executed by processing resource 128, to cause processing resource 128 to temporarily pause the transmission of packets from the switch when the data is identified as contain an anomaly. It is appreciated that such instructions can incorporate one or more aspects of blocks of method 110 or another suitable aspect of other implementations described herein (and vice versa).

Processing resource 128 of computing device 126 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 130, or suitable combinations thereof. Processing resource 128 can, for example, include single or multiple cores on a chip, multiple cores across multiple chips, multiple cores across multiple devices, or suitable combinations thereof. Processing resource 128 can be functional to fetch, decode, and execute instructions as described herein. As an alternative or in addition to retrieving and executing instructions, processing resource 128 can, for example, include at least one integrated circuit (IC), other control logic, other electronic circuits, or suitable combination thereof that include a number of electronic components for performing the functionality of instructions stored on memory resource 130. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 128 can, for example, be implemented across multiple processing units and instructions may be implemented by different processing units in different areas of computing device 126.

Memory resource 130 of computing device 126 can, for example, be in the form of a non-transitory machine-readable storage medium, such as a suitable electronic, magnetic, optical, or other physical storage apparatus to contain or store information such as machine-readable instructions 132, 134, 136, 138, and 140. Such instructions can be operative to perform one or more functions described herein, such as those described herein with respect to method 110 or other methods described herein. Memory resource 130 can, for example, be housed within the same housing as processing resource 128 for computing device 126, such as within a computing tower case for computing device 126 (in implementations where computing device 126 is housed within a computing tower case). In some implementations, memory resource 130 and processing resource 128 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 130 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 130 can be in communication with processing resource 128 via a communication link 142. Each communication link 142 can be local or remote to a machine (e.g., a computing device) associated with processing resource 128. Examples of a local communication link 142 can include an electronic bus internal to a machine (e.g., a computing device) where memory resource 130 is one of volatile, non-volatile, fixed, and/or removable storage medium in communication with processing resource 128 via the electronic bus.

In some implementations, one or more aspects of computing device 126 can be in the form of functional modules that can, for example, be operative to execute one or more processes of instructions 132, 134, 136, 138 or 140 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of computing device 126 can, for example, include one or more machine-readable storage mediums and one or more computer processors.

In view of the above, it is appreciated that the various instructions of computing device 126 described above can correspond to separate and/or combined functional modules. For example, instructions 132 can correspond to an "information receiving module" to receive instructions to monitor a resource of the switch. Likewise, instructions 134 can correspond to a "data monitoring module" to monitor time-series data for traffic received and transmitted by the switch. It is further appreciated that a given module can be used for multiple functions. As but one example, in some implementations, a single module can be used to both identify peaks for the switch resource (e.g., corresponding to the functionality of instructions 136) as well as to compare the identified peaks with data provided during a training phase (e.g., corresponding to the functionality of instructions 138).

One or more nodes within the network environment 100 (e.g., a network switch, etc.) can further include a suitable communication module to allow networked communication between network equipment. Such a communication module can, for example, include a network interface controller having an Ethernet port and/or a Fibre Channel port. In some implementations, such a communication module can include wired or wireless communication interface, and can, in some implementations, provide for virtual network ports. In some implementations, such a communication module includes hardware in the form of a hard drive, related firmware, and other software for allowing the hard drive to operatively communicate with other hardware of the switch or other network equipment. The communication module can, for example, include machine-readable instructions for use with communication the communication module, such as firmware for implementing physical or virtual network ports.

Figure 12:
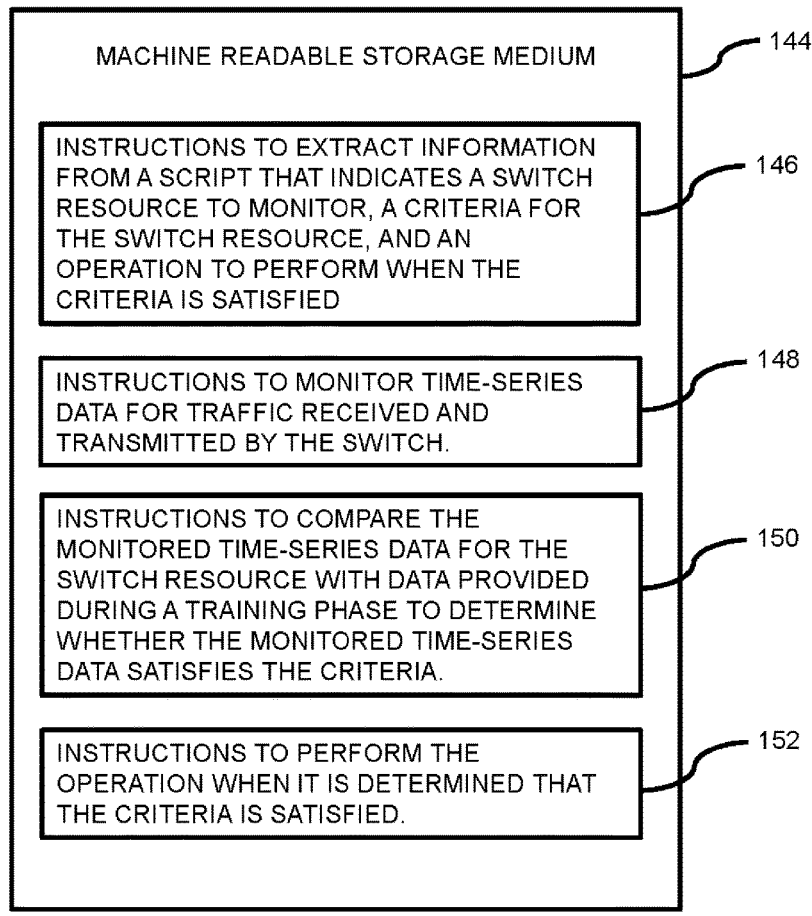
FIG. 12 is a diagram of machine-readable storage medium, according to an example.

FIG. 12 illustrates a machine-readable storage medium 144 including various instructions that can be executed by a computer processor or other processing resource. In some implementations, medium 144 can be housed within a network switch or on another computing device within network environment 100 or in local or remote wired or wireless data communication with network environment 100. For illustration, the description of machine-readable storage medium 144 provided herein makes reference to various aspects of computing device 126 (e.g., processing resource 128) and other implementations of the disclosure (e.g., method 110). Although one or more aspects of computing device 126 (as well as instructions such as instructions 132, 134, 136, 138, and 140) can be applied to or otherwise incorporated with medium 144, it is appreciated that in some implementations, medium 144 may be stored or housed separately from such a system. For example, in some implementations, medium 144 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 144 includes machine-readable instructions 146 stored thereon to cause processing resource 128 to extract information from a script that indicates a switch resource to monitor, a criteria for the switch resource, and an operation to perform when the criteria is satisfied. Instructions 146 can, for example, incorporate one or more aspects of block 112 of method 110 or another suitable aspect of other implementations described herein (and vice versa).

Medium 144 includes machine-readable instructions 148 stored thereon to cause processing resource 128 to monitor time-series data for traffic received and transmitted by the switch. Instructions 148 can, for example, incorporate one or more aspects of block 114 of method 110 or another suitable aspect of other implementations described herein (and vice versa).

Medium 144 includes machine-readable instructions 150 stored thereon to cause processing resource 128 to compare the monitored time-series data for the switch resource with data provided during a training phase to determine whether the monitored time-series data satisfies the criteria. Instructions 150 can, for example, incorporate one or more aspects of block 118 of method 110 or another suitable aspect of other implementations described herein (and vice versa).

Medium 144 includes machine-readable instructions 152 stored thereon to cause processing resource 128 to perform the operation when it is determined that the criteria is satisfied. Instructions 152 can, for example, incorporate one or more aspects of block 120 of method 110 or another suitable aspect of other implementations described herein (and vice versa).

In some implementations, medium 144 can include additional machine-readable instructions. Such instructions can, for example, be stored on the medium to cause processing resource 128 to store the time-series data for traffic received by the switch in a time-series database on the switch. Such instructions can, for example, incorporate one or more suitable aspects of other implementations described herein (and vice versa).

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method performed by a network switch, the method comprising:
    receiving instructions to monitor a switch resource;
    monitoring time-series data for traffic received and transmitted by the switch;
    identifying peaks for the switch resource in a specified time period for the monitored data;
    comparing the identified peaks with data provided during a training phase to identify whether the monitored data includes an anomaly; and
    generating an alert when the data is identified as containing an anomaly.

2. The method of claim 1, wherein the received instructions include criteria for the switch resource and instructions to perform an action when the criteria is satisfied.

3. The method of claim 1, wherein comparing the identified peaks with data provided during a training phase includes comparing monitored peaks with a weighted distance computed from the training phase.

4. The method of claim 1, further comprising:
    reporting the generated alert to a network administrator.

5. The method of claim 1, wherein monitoring time-series data for traffic received and transmitted by the switch includes monitoring a number of packets, bytes, and source-destination pairs.

6. The method of claim 1, further comprising:
transforming the monitored time-series data via a wavelet transformation operation.

7. The method of claim 1, further comprising:
performing a feature extraction operation on the monitored data to differentiate between different types of data.

8. The method of claim 7, wherein the feature extraction operation includes classifying packets based on flow and protocol.

9. The method of claim 1, wherein receiving instructions to monitor a switch resource includes receiving a script specifying a resource in the switch to be monitored via a REST Resource Identifier (URI) for the resource.

10. The method of claim 1, wherein receiving instructions to monitor a switch resource includes receiving a script specifying criteria for the resource and an operation to be performed when the criteria is satisfied.

11. The method of claim 10, wherein the criteria is whether a number of received packet bytes is more than specified threshold for a specified duration.

12. The method of claim 1, wherein the timeseries data comprises data that has been time stamped and converted to the timeseries data.

13. The method of claim 1, wherein the timeseries data comprises data that has been time plotted.

14. The method of claim 1, wherein the identification of whether the monitored data includes an anomaly comprises comparing the time-series data to a threshold and wherein the generation of the alert is in response to the threshold being satisfied for a predetermined duration of time.

15. The method of claim 1, wherein the identified peaks are compared with the data provided during the training phase to identify an anomaly consisting of a User Datagram Protocol flood, a port scan in a network and ping flooding.

16. The method of claim 1, wherein the identification of the peaks comprises comparing data values at different consecutive points in time.

17. A non-transitory machine readable storage medium for a network switch having stored thereon machine readable instructions to cause a computer processor of the network switch to:
extract information from a script that indicates a switch resource to monitor, a criteria for the switch resource, and an operation to perform when the criteria is satisfied;
monitor time-series data for traffic received and transmitted by the switch;
compare the monitored time-series data for the switch resource with data provided during a training phase to determine whether the monitored time-series data satisfies the criteria; and
perform the operation when it is determined that the criteria is satisfied.

18. The medium of claim 17, wherein the medium readable instructions are to cause a computer processor to:
store the time-series data for traffic received by the switch in a time-series database on the switch.

19. A network switch comprising:
a processing resource; and
a memory resource storing machine readable instructions to cause the processing resource to:
receive instructions to monitor a resource of the switch;
monitor time-series data for traffic received and transmitted by the switch;
identify peaks for the switch resource in a specified time period for the monitored data;
compare the identified peaks with data provided during a training phase to identify whether the monitored data includes an anomaly; and
generate an alert when the data is identified as containing an anomaly.

20. The network switch of claim 19, further comprising:
temporarily pause the transmission of packets from the switch when the data is identified as contain an anomaly.

* * * * *